(12) United States Patent
Aho et al.

(10) Patent No.: US 9,150,087 B2
(45) Date of Patent: Oct. 6, 2015

(54) TRUCK BED COVER

(71) Applicant: Engo Industries, LLC, Vancouver, WA (US)

(72) Inventors: Drew V. Aho, Vancouver, WA (US); Randall B. McCain, Silkeborg (NE); Robert A Bedient, Oregon City, OR (US)

(73) Assignee: Engo Industries, LLC, Vancouver, WA (US)

( * ) Notice: Subject to any disclaimer, the term of this patent is extended or adjusted under 35 U.S.C. 154(b) by 0 days.

(21) Appl. No.: 14/201,036

(22) Filed: Mar. 7, 2014

(65) Prior Publication Data

US 2014/0252794 A1    Sep. 11, 2014

Related U.S. Application Data

(60) Provisional application No. 61/774,923, filed on Mar. 8, 2013.

(51) Int. Cl.
*B60J 7/14* (2006.01)

(52) U.S. Cl.
CPC ...................... *B60J 7/141* (2013.01)

(58) Field of Classification Search
CPC .......................................................... B60J 7/141
USPC .............. 296/165, 26.07, 10, 136.01–136.05, 296/26.04, 100.01–100.1
See application file for complete search history.

(56) References Cited

U.S. PATENT DOCUMENTS

| | | | |
|---|---|---|---|
| 4,768,824 A | 9/1988 | Andonian | |
| 5,655,809 A | 8/1997 | Hutchinson | |
| 6,086,134 A | 7/2000 | Cravens | |
| 6,820,915 B2 * | 11/2004 | Mack et al. | 296/100.08 |
| 7,243,965 B2 * | 7/2007 | King et al. | 296/26.07 |
| 2006/0119124 A1 | 6/2006 | Briggs | |
| 2012/0223540 A1 | 9/2012 | Peck | |

\* cited by examiner

*Primary Examiner* — Glenn Dayoan
*Assistant Examiner* — Melissa A Black
(74) *Attorney, Agent, or Firm* — Luedeka Neely Group, P.C.

(57) ABSTRACT

A truck bed cover may be deployed as a tonneau cover or as a canopy cover. The truck bed cover includes a top shell and right and left side shells. The side shells are operable to pivot and slide with respect to the top shell so that the cover may be deployed in a canopy cover configuration or collapsed into a tonneau cover configuration. When in the tonneau cover configuration, the truck bed cover may be tilted up to provide access to the inside of the truck bed or tilted down into a closed position.

4 Claims, 10 Drawing Sheets

TRUCK BED COVER

RELATED APPLICATIONS

This non-provisional application claims priority to provisional application Ser. No. 61/774,923 filed Mar. 8, 2013, titled "Truck Bed Cover," the entire contents of which are incorporated herein by reference.

FIELD

This invention relates to accessories for pickup trucks. More particularly, this invention relates to a truck bed cover that may be deployed as a tonneau cover or as a canopy cover.

BACKGROUND

Various styles of truck bed covers are available to provide environmental protection to the contents of a pickup truck bed. Some common styles include hinged tonneau covers that tilt up to open, roll-up tonneau covers, and truck bed caps that are also referred to as canopies, toppers and camper shells. Each style has its advantages and disadvantages, and some styles are better suited for certain applications.

In the past, a truck owner had to choose one type of cover to be installed, and once installed, it was a significant task to remove it and replace it with a different type of cover. Thus, truck owners have generally been limited to using only one or the other type of cover once they have made their choice.

What is needed, therefore, is a truck bed cover that may be deployed as a tonneau cover or as a canopy cover, and that may be easily converted between the two configurations.

SUMMARY

The above and other needs are met by a truck bed cover for covering a truck bed having a front bed rail and opposing right and left side bed rails. The truck bed cover includes a top shell, right and left side shells, and several hinge assemblies.

The top shell has a top surface, a bottom surface disposed opposite the top surface, a front edge, a rear edge disposed opposite and substantially parallel to the front edge, a right side edge disposed substantially perpendicular to the front edge, and a left side edge disposed opposite and substantially parallel to the right side edge.

The right side shell has an outer surface, an upper edge that slides and pivots relative to the bottom surface of the top shell, and a lower edge disposed opposite the upper edge that is pivotally attached to the right side bed rail of the truck bed. When the truck bed cover is deployed in a tonneau cover position, the outer surface of the right side shell is substantially parallel to and adjacent the bottom surface of the top shell. When the truck bed cover is deployed in a canopy cover position, the outer surface of the right side shell is at an angle of between about 90 degrees and about 45 degrees relative to the bottom surface of the top shell.

The left side shell has an outer surface, an upper edge that is slides and pivots relative to the bottom surface of the top shell, and a lower edge disposed opposite the upper edge that is pivotally attached to the left side bed rail of the truck bed. When the truck bed cover is deployed in the tonneau cover position, the outer surface of the left side shell is substantially parallel to and adjacent the bottom surface of the top shell. When the truck bed cover is deployed in the canopy cover position, the outer surface of the left side shell is at an angle of between about 90 degrees and about 45 degrees relative to the bottom surface of the top shell.

An upper right hinge link pivotally connects the upper edge of the right side shell to the bottom surface of the top shell. An upper left hinge link pivotally connects the upper edge of the left side shell to the bottom surface of the top shell. A lower right hinge link pivotally connects the lower edge of the right side shell to the right side bed rail of the truck bed. A lower left hinge link pivotally connects the lower edge of the left side shell to the left side bed rail of the truck bed. A front hinge link pivotally connects the right side shell and the left side shell to the front bed rail of the truck bed.

The upper right and upper left hinge assemblies and the lower right and lower left hinge assemblies allow the truck bed cover to transition between the tonneau cover position and the canopy cover position. When deployed in the tonneau cover position, the front hinge link allows the truck bed cover to tilt up and down relative to the side bed rails.

When deployed in the canopy cover position, the truck bed cover may also include a removable front panel that may be attached to the front edge of the top shell between the right and left side shells, and a removable rear door that may be pivotally attached to the rear edge of the top shell between the right and left side shells.

In some embodiments, the truck bed cover includes a screw drive assembly for moving the right and left side shells with respect to the top shell. The screw drive assembly preferably includes a rail assembly that is attached to the bottom surface of the top shell. The rail assembly includes a right rail portion and a left rail portion. An electric drive motor is attached to the bottom surface of the top shell or to the rail assembly, and a gear assembly is engaged with the electric drive motor. A right drive screw is disposed parallel to the right rail portion and is rotatably engaged with the gear assembly. A left drive screw is disposed parallel to the left rail portion and is rotatably engaged with the gear assembly. A right carriage is disposed adjacent the right rail portion and is engaged with the right drive screw. The right carriage is operable to move along the right rail portion as the right drive screw rotates. A left carriage is disposed adjacent the left rail portion and is engaged with the left drive screw. The left carriage is operable to move along the left rail portion as the left drive screw rotates.

The screw drive assembly also includes a right hinge link having an inner end portion that is pivotally attached to the right carriage and an outer end portion that is pivotally attached to the right side shell adjacent its upper edge. A left hinge link has an inner end portion that is pivotally attached to the left carriage and an outer end portion that is pivotally attached to the left side shell adjacent its upper edge.

Operation of the electric drive motor causes rotation of the right and left drive screws, which causes movement of the right carriage along, the right rail portion and movement of the left carriage along the left rail portion, which causes movement of the right and left side shells with respect to the top shell. The movement of the right and left side shells results in vertical movement of the top shell with respect to the truck bed and transition of the truck bed cover between the tonneau cover position and the canopy cover position.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
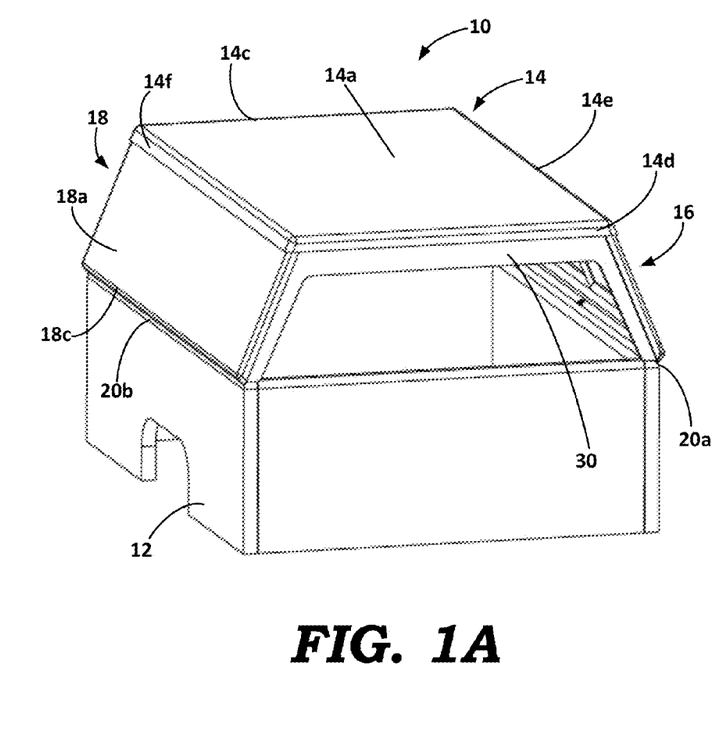
FIG. 1A is a rear perspective view of a truck bed cover deployed as a canopy cover according to an embodiment of the invention.
Figure 1B:
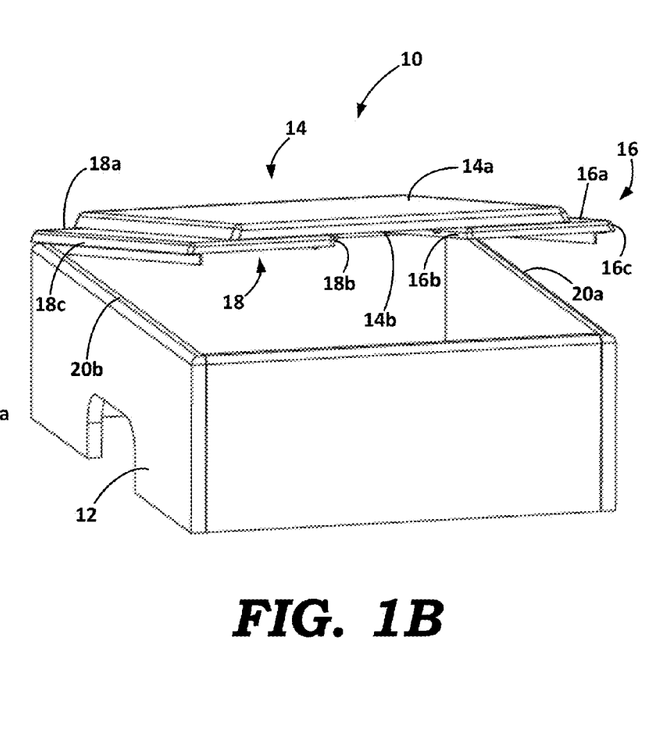
FIG. 1B is a rear perspective view of a truck bed cover deployed as a tonneau cover according to an embodiment of the invention.
Figure 2A:
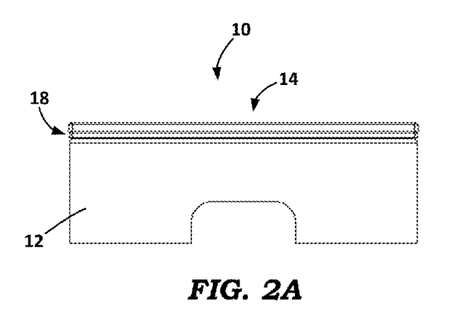
FIG. 2A is a side view of a truck bed cover deployed as a tonneau cover in a closed position according to an embodiment of the invention.
Figure 2B:
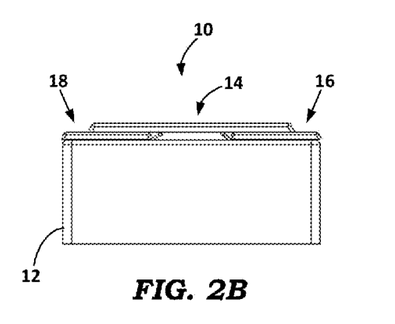
FIG. 2B is a rear view of a truck bed cover deployed as a tonneau cover in a closed position according to an embodiment of the invention.

FIGS. 1A, 4A, 4B and 8 depict a preferred embodiment of the truck bed cover 10 deployed in the canopy cover configuration. The cover 10 includes a top shell 14 and right and left side shells 16 and 18. As described in more detail herein, the side shells 16 and 18 are operable to pivot and slide with respect to the top shell 14 so that the cover 10 may collapse into the tonneau cover configuration shown in FIGS. 1B, 2A, 2B and 5. When the cover 10 is in the tonneau cover configuration, it may be tilted up to provide access to the inside of the truck bed 12 as shown FIGS. 1B and 5, or it may be tilted down into a closed position as shown in FIGS. 2A and 2B.

The top shell 14 has a top surface 14a, a bottom surface 14b opposite the top surface 14a, a front edge 14c, a rear edge 14d disposed opposite and substantially parallel to the front edge 14c, a right side edge 14e disposed substantially perpendicular to the front edge 14c, and a left side edge 14f disposed opposite and substantially parallel to the right side edge 14e.

The right side shell 16 has an outer surface 16a, an upper edge 16b that slides relative to and is pivotally attached to the bottom surface 14b of the top shell 14, and a lower edge 16c that is opposite the upper edge 16b and is pivotally attached to the right side bed rail 20a of the truck bed 12. When the truck bed cover 10 is deployed in a tonneau cover position, the outer surface 16a of the right side shell 16 is substantially parallel to and adjacent the bottom surface 14b of the top shell 14.

The left side shell 18 has an outer surface 18a, an upper edge 18b that slides relative to and is pivotally attached to the bottom surface 14b of the top shell 14, and a lower edge 18c that is opposite the upper edge 18b and is pivotally attached to the left side bed rail 20b of the truck bed 12. When the truck bed cover 10 is deployed in a tonneau cover position, the outer surface 18a of the left side shell 16 is substantially parallel to and adjacent the bottom surface 14b of the top shell 14.

Figure 3A:
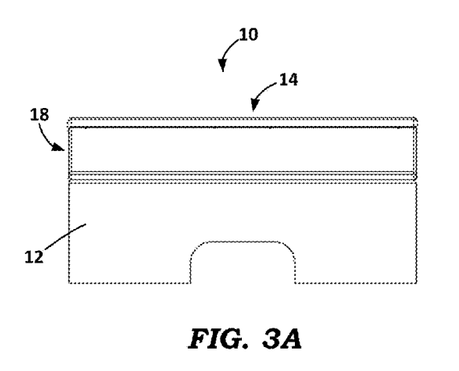
FIG. 3A is a side view of a truck bed cover in an intermediate stage of deployment between a tonneau cover configuration and a canopy cover configuration according to an embodiment of the invention.
Figure 3B:
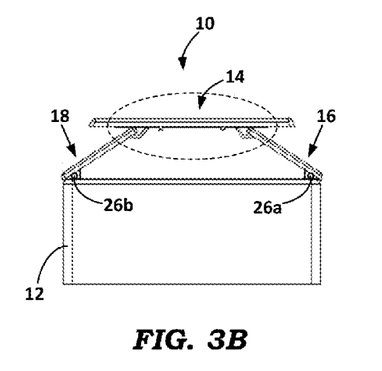
FIG. 3B is a rear view of a truck bed cover in an intermediate stage of deployment between a tonneau cover configuration and a canopy cover configuration according to an embodiment of the invention.
Figure 6:
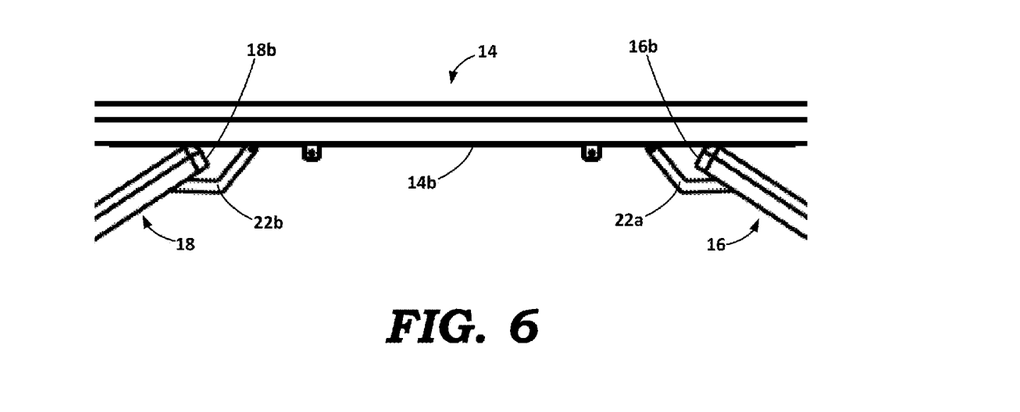
FIG. 6 is a detail view of a portion of a truck bed cover in an intermediate stage of deployment between a tonneau cover configuration and a canopy cover configuration according to an embodiment of the invention.

As shown in FIGS. 3B and 6, an upper right hinge link 22a pivotally connects the upper edge 16b of the right side shell 16 to the bottom surface 14b of the top shell 14, and an upper left hinge link 22h pivotally connects the upper edge 18b of the left side shell 18 to the bottom surface 14b of the top shell 14. As shown in the exploded view of FIG. 7, the upper right and upper left hinge assemblies 22a-22b connect to self-aligning anchors 24. In a preferred embodiment, the anchors 24 are physically captured between inner and outer panels of the side shells 16 and 18 when these panels are bonded together. The anchors 24 are allowed to pivot, thereby providing one degree of freedom which is atypical for a hinged joint. This degree of freedom allows for self-alignment to account for minor deviations in fabrication during sub-assembly construction, in a preferred embodiment, the physical connections between the anchors 24 and the hinge assemblies 22a-22b comprise bolts.

As shown in FIG. 3B, a lower right hinge link 26a pivotally connects the lower edge 16c to of the right side shell 16 to the right side bed rail 20a of the truck bed 12, and a lower left hinge link 26b pivotally connects the lower edge 18c of the left side shell 18 to the left side bed rail 20b of the truck bed 12. As shown in the exploded view of FIG. 7, the lower right and lower left hinge assemblies 26a-26b connect to self-aligning anchors 34. Like the anchors 24, the anchors 34 are physically captured between the inner and outer panels of the side shells 16 and 18 when is these panels are bonded together. The anchors 34 are allowed to pivot, thereby providing one degree of freedom which is atypical for a hinged joint. This degree of freedom allows for self-alignment to account for minor deviations in fabrication during sub-assembly construction. In a preferred embodiment, the physical connections between the anchors 34 and the hinge assemblies 26a-26b comprise bolts.

Figure 4A:
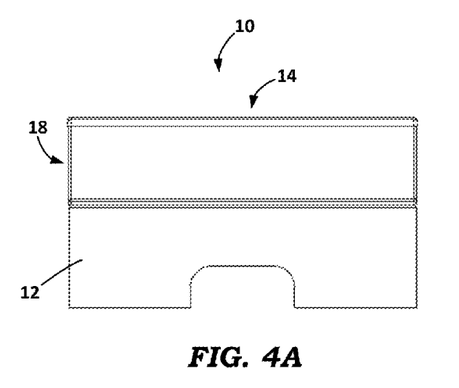
FIG. 4A is a side view of a truck bed cover deployed as a canopy cover according to an embodiment of the invention.
Figure 4B:
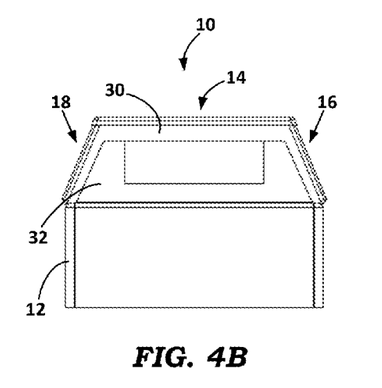
FIG. 4B is a rear view of a truck bed cover deployed as a canopy cover according to an embodiment of the invention.

The upper right and left hinge assemblies 22a-22b and the lower right and left hinge assemblies 26a-26b allow the truck bed cover 10 to transition from the tonneau cover position (FIGS. 2A-2B) through an intermediate position (FIGS. 3A-3B) to the canopy cover position (FIGS. 4A-4B).

Figure 5:
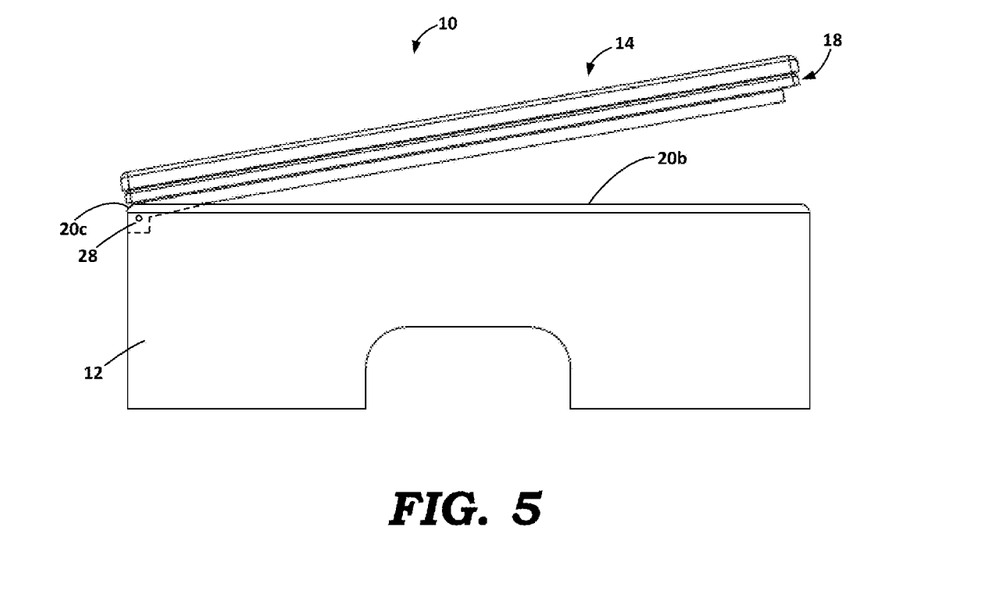
FIG. 5 is a side view of a truck bed cover deployed as a tonneau cover in an open position according to an embodiment of the invention.

As shown in FIG. 5, a front hinge link 28 pivotally connects the right and left side shells 16 and 18 to the front bed rail 20c of the truck bed 12. When deployed in the tonneau cover position, the front hinge link 28 allows the truck bed cover 10 to tilt up and down relative to the side bed rails 20a and 20b. In a preferred embodiment, the range of tilt is about 10 degrees to about 0 degrees.

Figure 7:
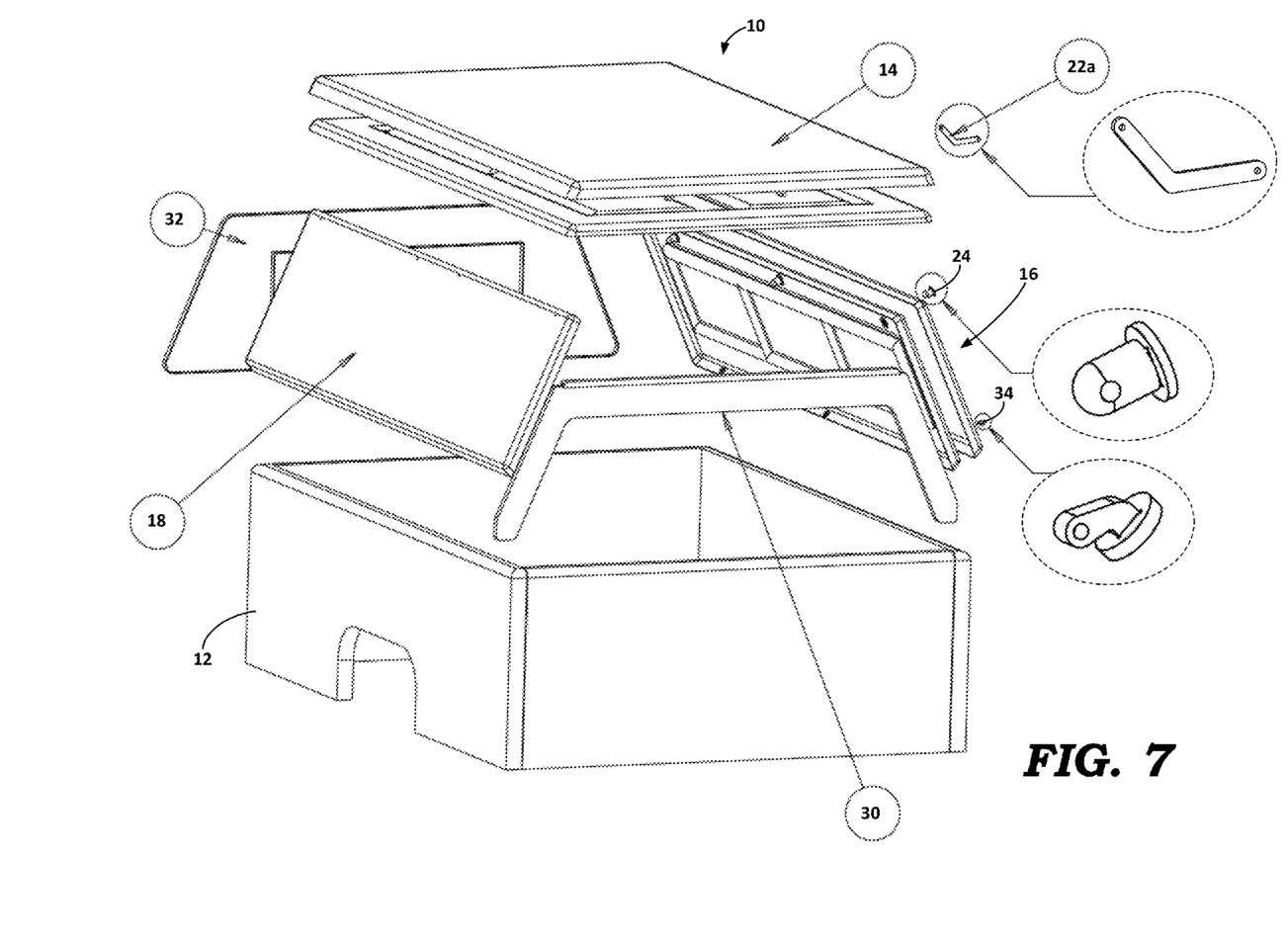
FIG. 7 is an exploded view of a truck bed cover according to an embodiment of the invention.
Figure 8:
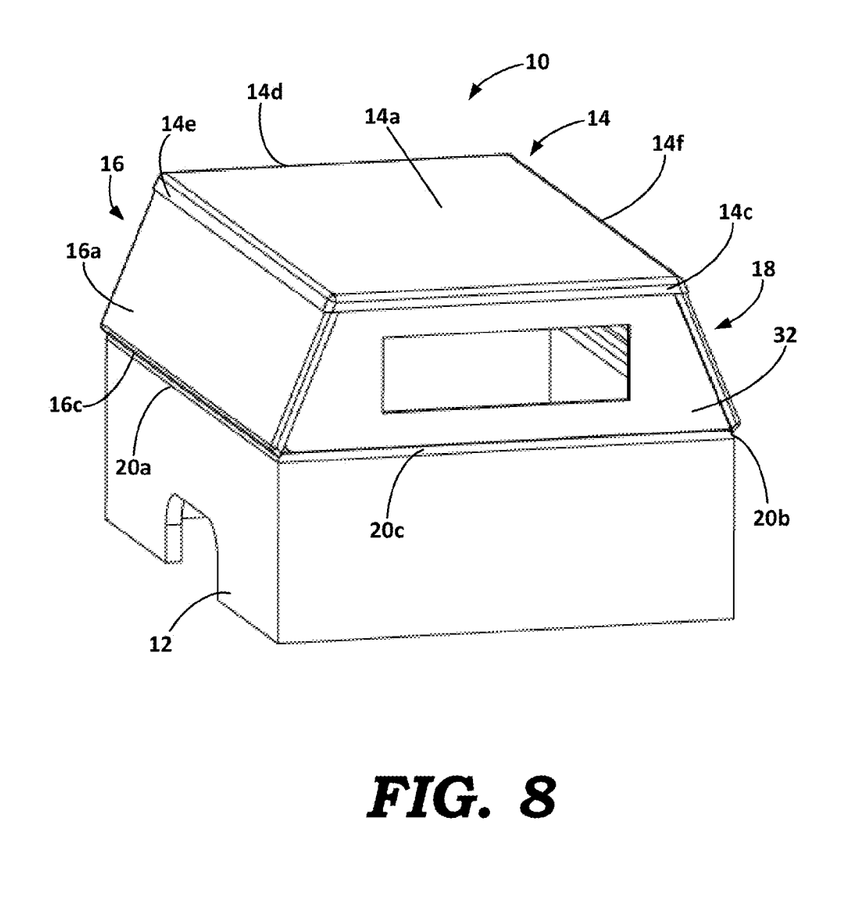
FIG. 8 is a front perspective view of a truck bed cover deployed as a canopy cover according to an embodiment of the invention.

When deployed in the canopy cover position, a preferred embodiment of the truck bed cover 10 depicted in FIGS. 4B and 7 includes a removable front panel 32 that may be attached to the front edge 14c of the top shell 14 between the right and left side shells 16 and 18. The preferred embodiment also includes a removable rear door 30 that may be pivotally attached to the rear edge 14d of the top shell 14 between the right and left side shells 16 and 18.

FIG. 7 depicts components of a preferred embodiment of the truck bed cover 10 in an exploded view. As this view indicates, the top shell 14 and right and left shells 16 and 18 are preferably assemblies that include inner and outer panels that bonded together to form an integral structure with structural integrity and rigidity. The shells 16 and 18 may also include an internal framework to support various features, such as windows, hinged doors and contact points for attaching lifting components to raise and lower the bed cover between the tonneau configuration and the canopy configuration. These internal support components may be constructed from T-slotted aluminum framing and/or aluminum weldments. These optional components may be physically captured within the panels during a vacuum thermoforming process to minimize labor and material cost.

Some embodiments of the truck bed cover include powered means for transitioning between the tonneau position and the canopy position. In a preferred embodiment depicted in FIGS. 9-13, 14A and 14B, the powered means comprise a screw drive assembly 35, which is similar to mechanisms employed in some garage door openers. These figures depict one half of the assembly 35 that moves the side panel 16. The other half of the assembly 35, which moves the side panel 18, is substantially a mirror image of the half depicted in FIGS. 9-13, 14A and 14B, and the following description applies as well to time other half.

In this embodiment, the inner end portion of the hinge link 22a is pivotally connected to a carriage 50a by an upper pin 54a that passes through an upper guide slot 42a in a U-shaped rail 40a. In a preferred embodiment, the carriage 50a is disposed within the "U" of the U-shaped rail 40a. A lower pin 52a passes through a lower guide slot 44a in the rail 40a to pivotally and slidingly connect the inner end portion of the hinge link 22a to the rail 40a. The carriage 50a is engaged with the threads of a drive screw 46a that runs substantially the length of the rail 40a. As the drive screw 46a rotates in one direction, the carriage 50a is driven by the threads to move away from the center toward the right side edge 14e of the top shell 14. As the drive screw 46a rotates in the opposite direction, the carriage 50a is driven by the threads to move away from the right side edge 14e toward the center of the top shell.

The inner end of the drive screw 46a is connected by a coupler 48a to a central gear reduction assembly 38, which is connected to an electric motor 36. When power is applied, the motor 36 rotates the drive screw 46a via the gear reduction assembly 38 which causes movement of the carriage 50a.

Figure 9:
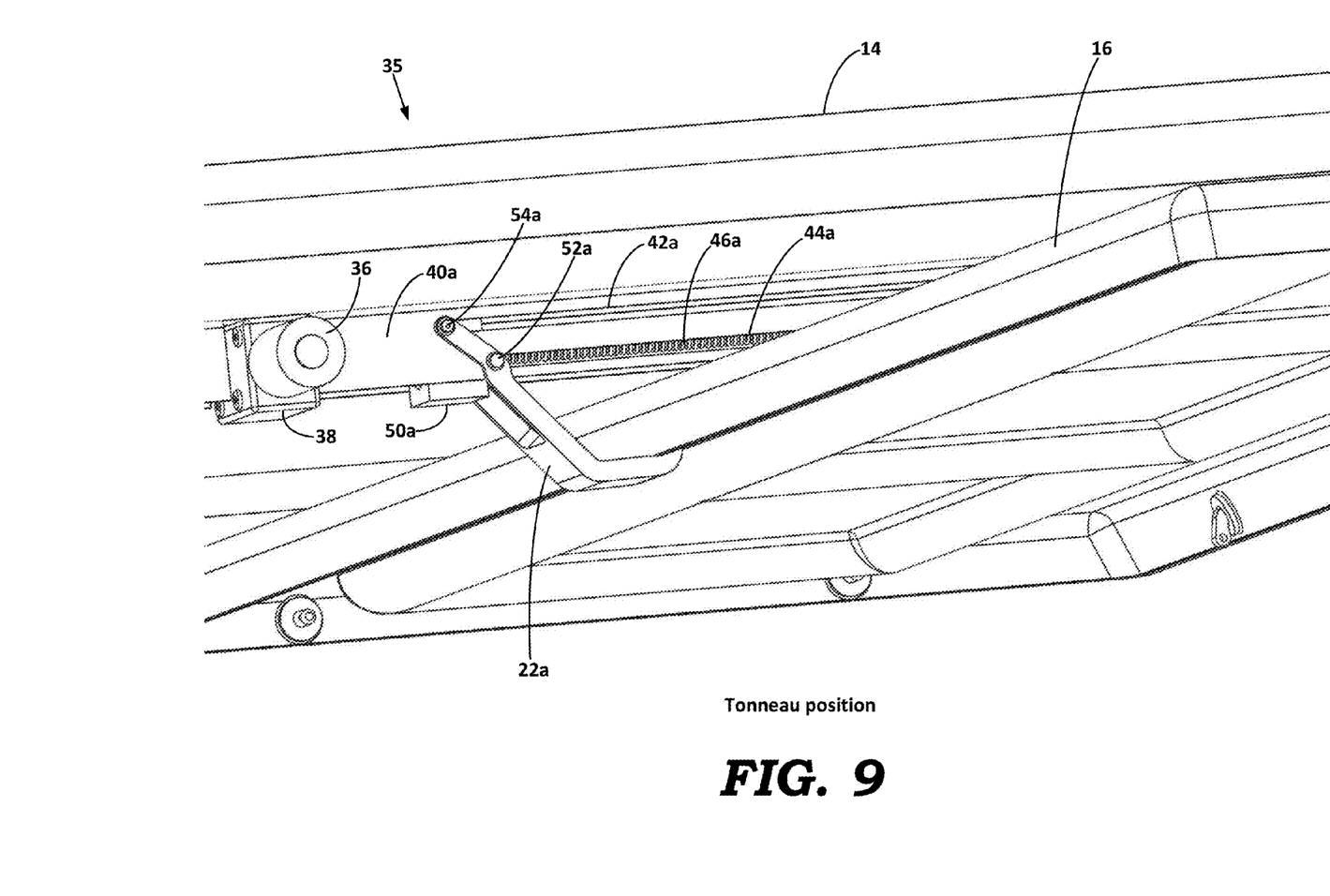
FIGS. 9-13, 14A and 14B depict a mechanism for transitioning a truck bed cover between a tonneau cover position and a canopy cover position according to an embodiment of the invention.
Figure 10:
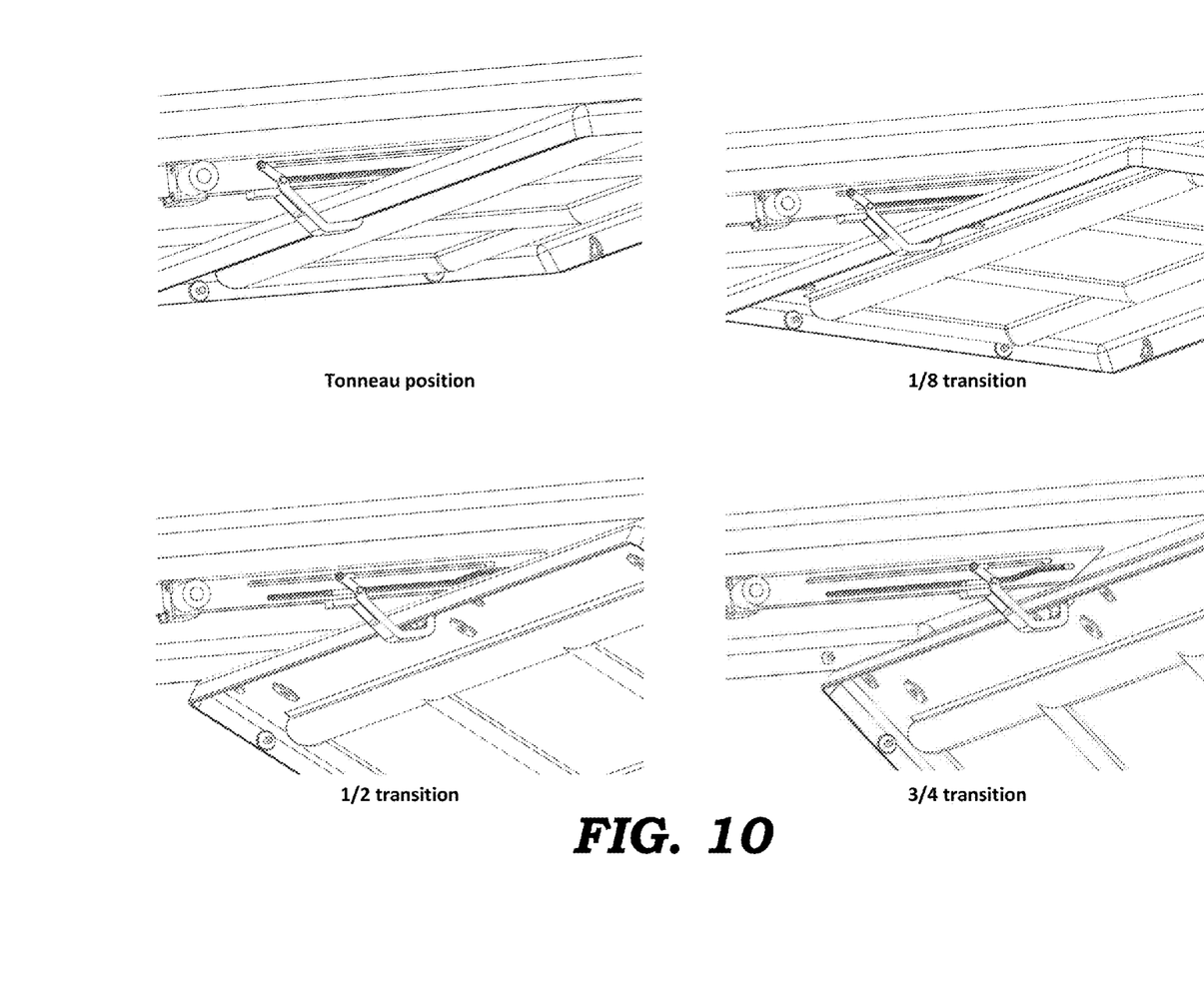
Figure 11:
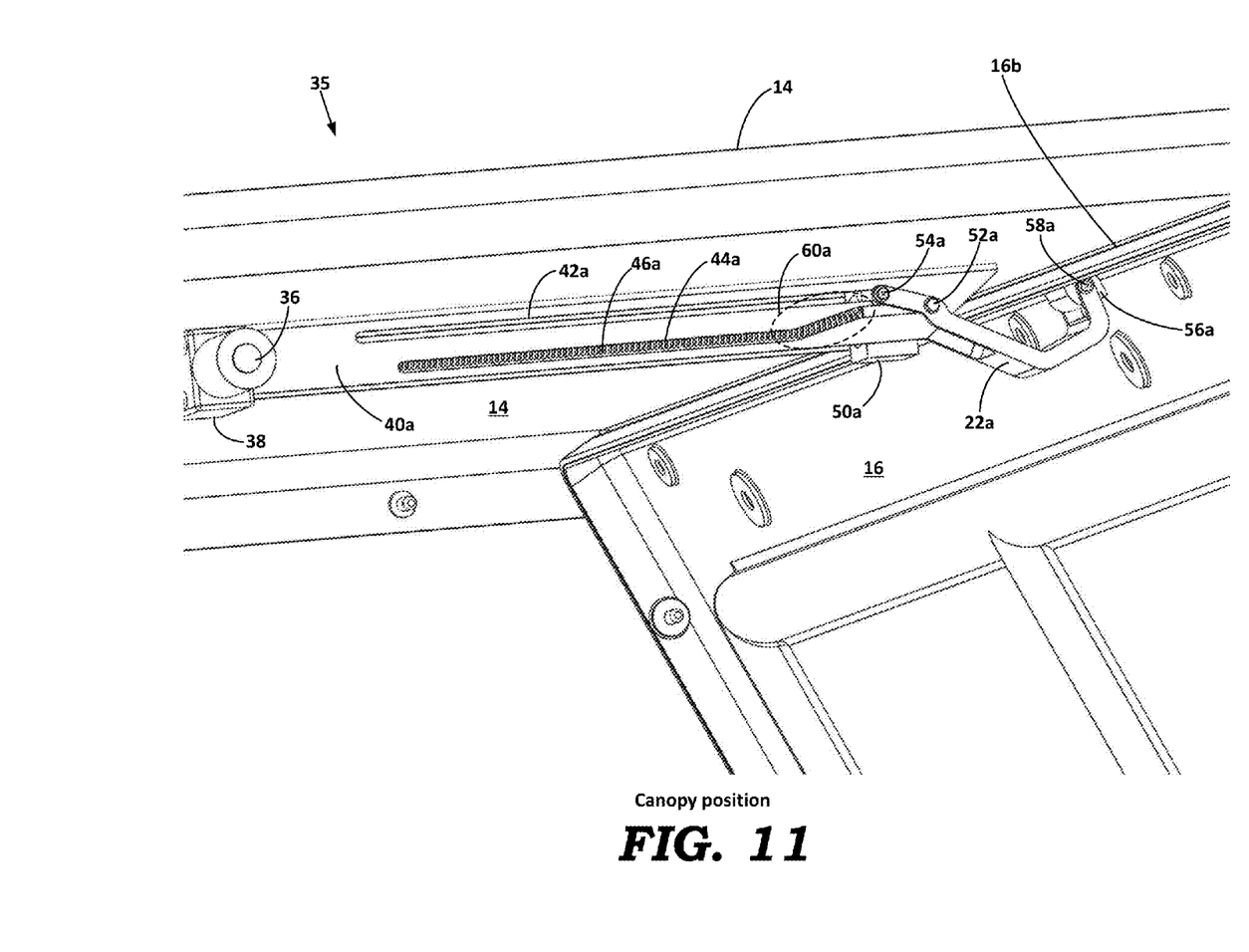

FIG. 9 depicts the screw drive assembly 35 with the side panel 16 in the tonneau position. FIG. 10 depicts the screw drive assembly 35 with the side panel 16 in the tonneau position and in three intermediate positions between the tonneau position and the canopy position. FIG. 11 depicts the screw drive assembly 35 with the side panel 16 in the canopy position.

As shown in FIG. 11, the upper guide slot 42a is substantially straight along its entire length. The lower guide slot 44a is substantially straight in the portion nearest the motor 36, has an upward angled portion 60a near its outer end, and is substantially straight in the portion adjacent the outer end. Engagement of this slot structure with the upper and lower pins 54a and 52a causes the outer end portion of the hinge link 22 to pivot upward when the carriage 50a approaches the outer end of the rail 40a. The upward movement of the outer end portion of the hinge link 22a causes the upper edge 16b of the right side shell 16 to move upward and engage the bottom surface 14b of the top shell 14 when the bed cover is in the canopy position. When the carriage 50a moves in the opposite direction—out of the canopy position toward the tonneau position—the slot structure causes the outer end portion of the hinge link 22 to pivot downward. The downward movement of the outer end portion of the hinge link 22 causes the upper edge 16b of the right side shell 16 to move downward so that it clears the bottom of the rail 40a as the carriage 50a moves toward the center.

Figure 14A:
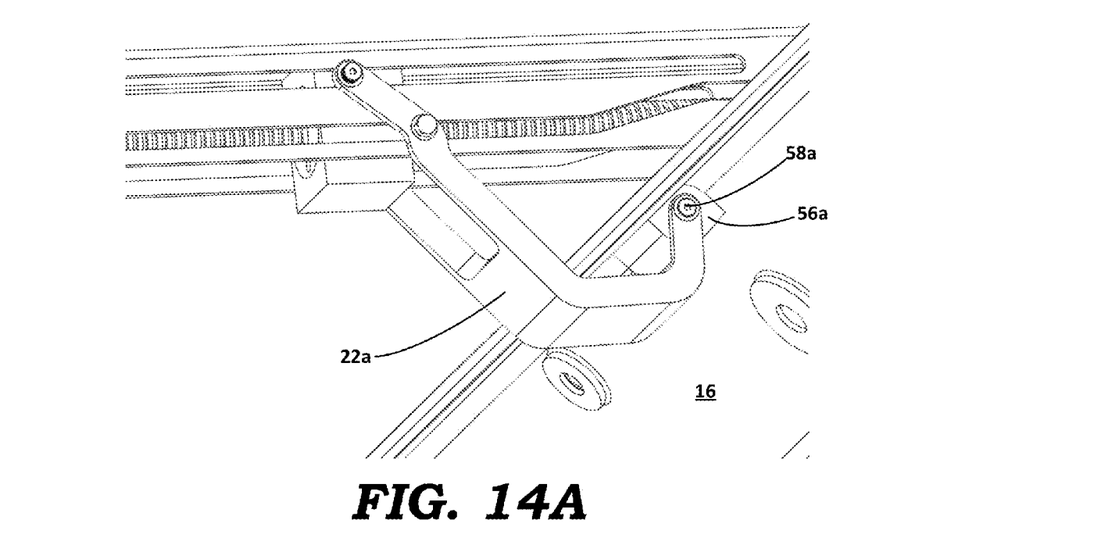
Figure 14B:
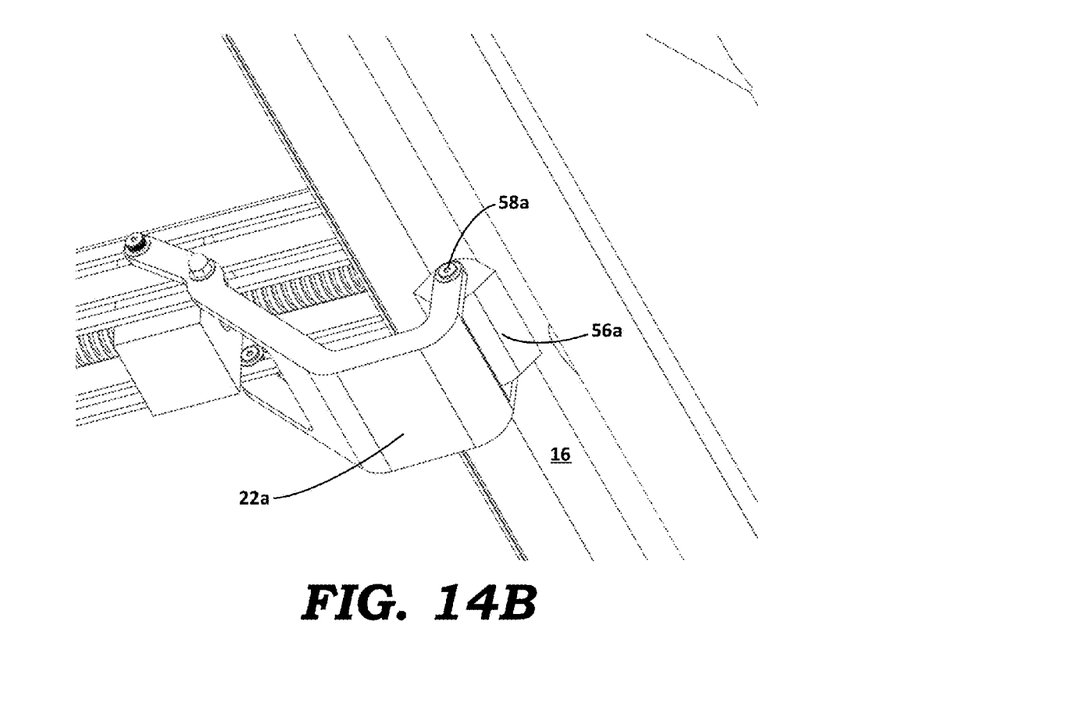

As shown in FIGS. 14A and 14B, the outer end portion of the hinge link 22a is pivotally connected to a hinge member 56a by a hinge pin 58a. In a preferred embodiment, the hinge member 56a is rigidly attached to the bottom surface and/or the lip of the right side shell 16, such as with adhesive or fasteners.

Figure 12:
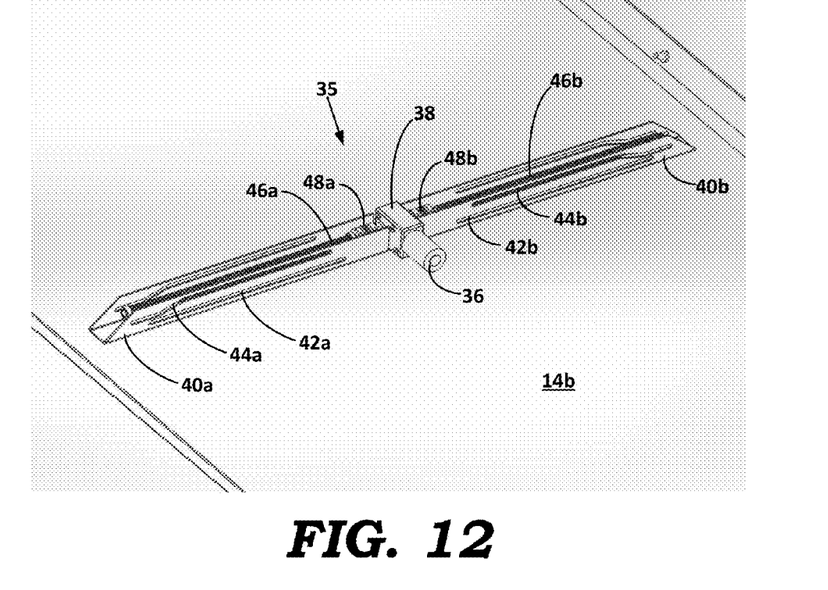
Figure 13:
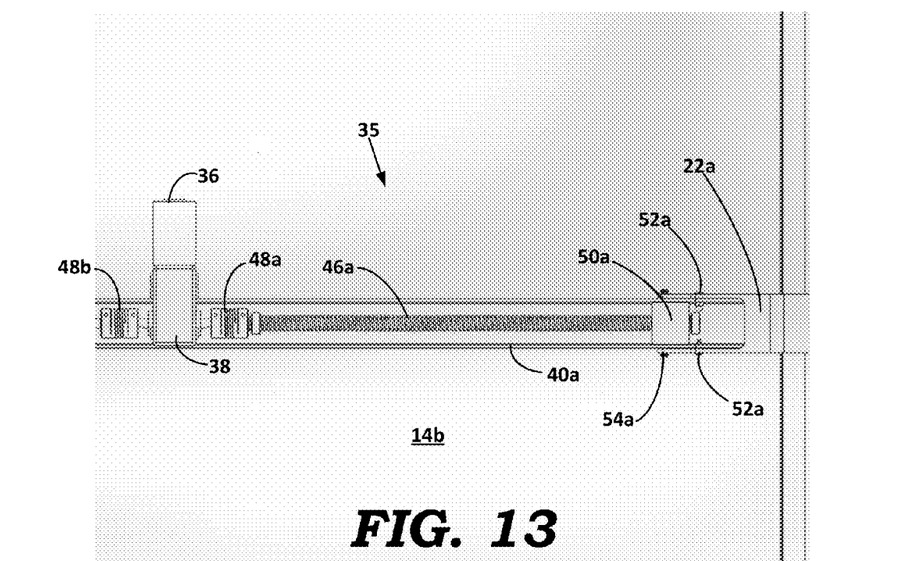

FIG. 12 provides a bottom perspective view of the full screw drive assembly 35, except with the carriages and hinge link assemblies removed. FIG. 13 provides a bottom plan view of the right side of the screw drive assembly 35 with the right side shell 16 in the canopy position.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A truck bed cover for covering a truck bed having a front bed rail and opposing right and left side bed rails, the truck bed cover comprising:
    a top shell comprising:
        a bottom surface;
        a right side edge; and
        a left side edge;
    a right side shell comprising:
        an outer surface;
        an upper edge attached to the bottom surface of the top shell; and
        a lower edge disposed opposite the upper edge, the lower edge configured for pivotal attachment to the right side bed rail of the truck bed,
        wherein the outer surface of the right side shell is disposed adjacent the bottom surface of the top shell when the truck bed cover is deployed in a tonneau cover position, and
        wherein the outer surface of the right side shell is disposed in a nonparallel position relative to the bottom surface of the top shell when the truck bed cover is deployed in a canopy cover position;
    a left side shell having:
        an outer surface;
        an upper edge attached to the bottom surface of the top shell; and
        a lower edge disposed opposite the upper edge, the lower edge configured for pivotal attachment to the left side bed rail of the truck bed,
        wherein the outer surface of the left side shell is disposed adjacent the bottom surface of the top shell when the truck bed cover is deployed in the tonneau cover position, and
        wherein the outer surface of the left side shell is disposed in a nonparallel position relative to the bottom surface of the top shell when the truck bed cover is deployed in the canopy cover position; and a screw drive assembly comprising:
   a rail assembly attached to the bottom surface of the top shell, the rail assembly comprising a right rail portion disposed perpendicular to the right side edge of the top shell and a left rail portion disposed perpendicular to the left side edge of the top shell;
   an electric drive motor attached to the bottom surface of the top shell or to the rail assembly;
   a gear assembly disposed between the right rail portion and the left rail portion and engaged with the electric drive motor;
   a right drive screw disposed parallel to the right rail portion and rotatably engaged with the gear assembly;
   a left drive screw disposed parallel to the left rail portion and rotatably engaged with the gear assembly;
   a right carriage disposed adjacent the right rail portion and engaged with the right drive screw, the right carriage operable to move along the right rail portion as the right drive screw rotates;
   a left carriage disposed adjacent the left rail portion and engaged with the left drive screw, the left carriage operable to move along the left rail portion as the left drive screw rotates;
   a right hinge link having an inner end portion pivotally attached to the right carriage and an outer end portion pivotally attached to the right side shell adjacent the upper edge thereof; and
   a left hinge link having an inner end portion pivotally attached to the left carriage and an outer end portion pivotally attached to the left side shell adjacent the upper edge thereof,
wherein operation of the electric drive motor causes rotation of the right and left drive screws, which causes movement of the right carriage along the right rail portion and movement of the left carriage along the left rail portion, which causes movement of the right side shell and the left side shell with respect to the top shell, which movement results in vertical movement of the top shell with respect to the truck bed and transition of the truck bed cover between the tonneau cover position and the canopy cover position.

2. The truck bed cover of claim 1 further comprising:
one or more right lower hinge links operable to pivotally connect the lower edge of the right side shell to the right side bed rail of the truck bed; and
   one or more left lower hinge links operable to pivotally connect the lower edge of the left side shell to the left side bed rail of the truck bed.

3. The truck bed cover of claim 1 further comprising one or more front hinge links operable to pivotally connect the right side shell and the left side shell to the front bed rail of the truck bed, thereby enabling the truck bed cover to tilt at an angle relative to the side bed rails when the truck bed cover is deployed in the tonneau cover position.

4. The truck bed cover of claim 1 wherein:
   the right rail portion of the rail assembly includes:
      at least one elongate right upper guide slot; and
      at least one elongate right lower guide slot disposed below the right upper guide slot, the right lower guide slot having:
         two end portions that are substantially parallel to the right upper guide slot; and
         an angled portion disposed between the two end portions that is angled upward toward the right upper guide slot;
   the left rail portion of the rail assembly includes:
      at least one elongate left upper guide slot; and
      at least one elongate left lower guide slot disposed below the left upper guide slot, the left lower guide slot having:
         two end portions that are substantially parallel to the left upper guide slot; and
         an angled portion disposed between the two end portions that is angled upward toward the left upper guide slot;
   at least one right upper pin that passes through the right upper guide slot and pivotally connects the inner end portion of the right hinge link to the right carriage;
   at least one left upper pin that passes through the left upper guide slot and pivotally connects the inner end portion of the left hinge link to the left carriage;
   at least one right lower pin that passes through the right lower guide slot, the right lower pin pivotally and slidingly connecting the inner end portion of the right hinge link to the right rail portion; and
   at least one left lower pin that passes through the left lower guide slot, the left lower pin pivotally and slidingly connecting the inner end portion of the left hinge link to the left rail portion.

* * * * *